United States Patent [19]
Strolle

[11] Patent Number: 5,822,490
[45] Date of Patent: Oct. 13, 1998

[54] APPARATUS AND METHOD FOR COLOR-UNDER CHROMA CHANNEL ENCODED WITH A HIGH FREQUENCY LUMINANCE SIGNAL

[75] Inventor: Christopher H. Strolle, Glenside, Pa.

[73] Assignee: SamSung Electronics Co., Ltd., Suwon, Rep. of Korea

[21] Appl. No.: 996,525

[22] Filed: Dec. 23, 1992

Related U.S. Application Data

[63] Continuation-in-part of Ser. No. 609,536, Nov. 5, 1990, abandoned, and Ser. No. 531,070, May 31, 1990, abandoned.

[51] Int. Cl.[6] .................................................. H04N 9/79
[52] U.S. Cl. ................................. 386/1; 386/36; 386/44
[58] Field of Search .................................. 358/310, 330, 358/329, 11, 12, 31, 166, 167, 328; 386/1, 36, 44; H04N 9/79, 9/83, 11/20, 11/06, 9/64

[56] References Cited

U.S. PATENT DOCUMENTS

| | | | |
|---|---|---|---|
| 4,490,749 | 12/1984 | Hirota | 358/328 |
| 4,554,595 | 11/1985 | Tanaka et al. | 358/328 |
| 4,636,841 | 1/1987 | Moles et al. | 358/31 |
| 4,831,463 | 5/1989 | Faroudja | 358/310 |
| 4,870,481 | 9/1989 | Kawamata . | |
| 4,984,093 | 1/1991 | Schmidtmann et al. . | |
| 5,016,111 | 5/1991 | Sakamoto et al. | 358/329 |
| 5,031,030 | 7/1991 | Hurst, Jr. . | |
| 5,063,457 | 11/1991 | Ishikawa et al. | 358/330 |
| 5,083,203 | 1/1992 | Ko et al. | 358/105 |
| 5,113,262 | 5/1992 | Strolle et al. | 358/310 |
| 5,144,453 | 9/1992 | Suga et al. | 358/311 |
| 5,161,030 | 11/1992 | Song . | |
| 5,278,637 | 1/1994 | Naimpally | 348/488 |

FOREIGN PATENT DOCUMENTS

| | | | |
|---|---|---|---|
| 3178291 | 2/1991 | Japan | H04N 9/83 |
| PCT/GB90/ 00109 | 1/1989 | United Kingdom . | |
| 2252004 | 7/1992 | United Kingdom | H04N 9/83 |

OTHER PUBLICATIONS

"Television Electronics: Theory and Servicing" by Milton S. Kiver & Milton Kaufman, Delmar Publishers Inc., Albany, New York 12212, 8th ed., p. 186.
EP 0 484 154 A2 by Yong–Je Kim.
EP 0015 499 A1 by Yamamitsu.
Journal of British I.R.E. on "Reduction of Television Bandwidth by Frequency–Interlace", Feb. 1960, pp. 127–136 (disclosed by Howson and Bell).
U.S. Patent application Serial No. 07/569029.
U.S. Patent application Serial No. 07/531070.
U.S. Patent application Serial No. 07/531057.

*Primary Examiner*—Thai Tran
*Attorney, Agent, or Firm*—Robert E. Bushnell, Esp.

[57] ABSTRACT

A video signal processing system has luminance signal and a chroma carrier modulated with chrominance information. The system includes circuitry responsive to the chroma carrier for generating a phase alternating carrier having a phase alternating from field to field; circuitry for modulating a selected luminance signal on the phase alternating carrier and circuitry for adding the modulated phase alternating carrier to the chroma carrier modulated with chroma information.

35 Claims, 5 Drawing Sheets

APPARATUS AND METHOD FOR COLOR-UNDER CHROMA CHANNEL ENCODED WITH A HIGH FREQUENCY LUMINANCE SIGNAL

This is a continuation-in-part of U. S. patent application Ser. No. 07/609,536 filed Nov. 5, 1990, and now abandoned.

BACKGROUND OF THE INVENTION

The present invention relates generally to apparatus and a method for processing video signals comprising chrominance and luminance signals and, more particularly, to video signals as generally processed in a video tape recorder wherein a separate channel is used for recording a chrominance signal on a magnetic tape.

As is known, the spectrum of a luminance (and sync) television signal consists of a dc component and components at harmonics of the horizontal scan frequency, each with a cluster about it of components separated at the vertical scan rate. Chrominance information is generally transmitted in the spectral gaps between these components. In the NTSC system, for example, two components of the chrominance signal, the in-phase (I) and quadrature (Q) signals, are amplitude modulated in quadrature to each other onto a subcarrier whose frequency (3.579545 MHz) has been selected to cause the resulting chrominance sidebands to fall in the spectral gaps between the luminance spectral components. The composite signal thus includes interleaved luminance and chrominance signals. The subcarrier frequency results in horizontal, vertical, and temporal interleaving so as to minimize mutual interference from cross-talk between the luminance and chrominance signals.

In typical video recording systems such as video cassette recorders (VCR's) used in the home for recording television signals, it is known, for the purpose of recording on a magnetic tape, to transpose the chrominance signal conventionally situated in the upper portion of the frequency spectral band of a composite television signal to a position in the spectral band below the luminance signal. Such a modulation or down conversion is commonly known in the recording art as a "color-under" recording system. In such a color-under system, the in-phase (I) and quadrature (Q) components of the chrominance signal are processed conventionally, albeit, at a different carrier frequency to develop a color signal (C) for displaying a scene.

The well-known VHS system utilized in many VCR's produces degraded picture quality in comparison with, for example, properly received and processed broadcast television signals because it does not provide the full necessary horizontal resolution. It has long been a goal of television engineers to find ways of transmitting more information in a channel of given bandwidth. The frame and line rates are generally fixed in accordance with standards, and therefore, a bandwidth limitation typically results in a reduction in horizontal resolution. The typical restricted bandwidth of, for example, the VHS system of about 2.0 to 2.5 MHz thus produces an image of inadequate horizontal resolution.

Various techniques are known for recording a full bandwidth signal on a limited bandwidth medium such as magnetic tape. U.S. Pat. No. 5,113,262 issued 12 May 1992 to C. H. Strolle et alii, entitled VIDEO SIGNAL RECORDING SYSTEM ENABLING LIMITED BANDWIDTH RECORDING AND PLAYBACK, and herein incorporated by reference, discloses such a system. Furthermore, a number of prior U.S. patent applications and other publications are discussed in U.S. Pat. No. 5,113,262. Other systems, such as, for example, that disclosed in U.S. Pat. No. 4,831,463, issued May 16, 1989 to Faroudja, require modification of the format such that a tape recorded in accordance with that system would result in undesirable artifacts or defects in the picture when played back on a standard unmodified VHS machine.

It is herein recognized that the spectrum of the chrominance signal as utilized in the color-under format exhibits spectral gaps. Thus, commonly assigned pending U.S. patent application Ser. No. 07/531,070 of Strolle et al., entitled CHROMA CHANNEL ENCODED WITH AUXILIARY SIGNALS and herein incorporated by reference, discloses apparatus and a method wherein auxiliary signals, for example, digital audio signals or motion signals, are modulated onto a phase alternating carrier which is then added to the modulated chrominance carrier and processed in the chrominance channel for recording on magnetic tape.

SUMMARY OF THE INVENTION

In accordance with an aspect of the invention, a video signal processing system having a luminance signal and having a chroma carrier modulated with chrominance information, includes a system comprising circuitry responsive to the chroma carrier for generating a phase alternating carrier having a phase alternating from field to field; circuitry for modulating a selected luminance signal on the phase alternating carrier; and circuitry for adding the phase alternating carrier to the chroma carrier modulated with chroma information.

In accordance with another aspect of the invention, the system includes a filter for selecting a spectral portion of the luminance signal for providing the selected luminance signal.

In accordance with a further aspect of the invention, a video signal processing system for recording a wideband video signal on a limited bandwidth medium, comprises an input terminal for receiving a video signal; a signal processing arrangement coupled to the input terminal, for separating the input signal into a first frequency band including a chrominance signal and a first luminance signal component, a second frequency band including a second luminance signal component, and a third frequency band including a third luminance signal component, the signal processing arrangement folding the second luminance signal into the first frequency band for providing an augmented chrominance signal; and an arrangement for recording the third luminance signal component and the augmented chrominance signal.

In accordance with still a further aspect of the invention, a first bandpass filter arrangement is coupled to the input terminal for passing signals in the first frequency band; a second bandpass filter arrangement is coupled to the input terminal for passing signals in the second frequency band; a first modulator arrangement, having a first input coupled to an output of the second bandpass filter and a second input coupled to a source of a first modulating frequency; a first adding arrangement has a first input coupled to an output of the first bandpass filter and has a second input coupled to an output of the modulator; and a combining arrangement is coupled to an output of the adder for combining the third luminance component and the augmented chrominance signal.

In accordance with yet a further aspect of the invention, the combining arrangement comprises a filter arrangement coupled to the input terminal for providing the third luminance signal component; a source of a second modulating frequency; second modulator arrangement having a first input coupled to an output of the first adding arrangement and having a second input coupled to the source of a second modulating frequency; and a second adding arrangement having a first input coupled to the filter arrangement and having a second input coupled to an output of the second modulator arrangement.

In accordance with still yet a further aspect of the invention, the combining arrangement comprises a motion spread signal generator having an input coupled to the input terminal; soft switch arrangement having a first input coupled to the output of the first bandpass filter arrangement, having a second input, having an output coupled to the first input of first adding arrangement, and having a control terminal coupled to an output of the motion spread signal generator; a 1H comb filter arrangement coupled between the output of the first bandpass filter arrangement and a second input of the soft switch arrangement.

In accordance with another aspect of the invention, when no motion is detected, the soft switch arrangement transmits substantially a signal from the first bandpass filter arrangement and when motion is detected, the soft switch arrangement transmits a signal by way of the 1H comb filter.

In accordance with still another aspect of the invention, the first modulating frequency is locked to a horizontal sweep rate and exhibits field to field alternation.

In accordance with a aspect of the invention, a video signal processing system for playback of a video signal including a luminance signal component and an augmented chrominance component including a folded luminance signal component recorded on a limited bandwidth medium, comprises a signal processing arrangement coupled to a source of a playback signal for receiving the augmented chrominance signal and for separating out a folded luminance component from the augmented chrominance signal; and an adding arrangement having a first input coupled to the source of a playback signal and having a second input coupled to the signal processing arrangement for adding the luminance signal component and the folded luminance signal component.

In a video signal processing system for a television signal comprising a luminance signal and a chroma carrier modulated with chrominance information, a method for recording, in accordance with an aspect of the invention, comprises the steps of: selecting by filtering first, second, and third spectral portions of said television signal, such that said first spectral portion includes a region about said chroma carrier, said third spectral portion includes the lower frequency end spectral region of the television signal, and the second spectral portion is intermediate the first and third spectral portions; and frequency transposing signals in the second spectral portion into the first spectral portion to provide an augmented signal.

DETAILED DESCRIPTION

The preferred embodiments are herein described in the context of the NTSC standards in use in the United States by way of example. Nevertheless, the principles of the invention are applicable to other systems such as the PAL system, used in parts of Europe and elsewhere. It should also be noted that the invention is applicable to color television transmission systems and recording systems in which the chrominance and luminance systems are not spectrally interleaved in accordance with a standard NTSC television system.

Figure 1:
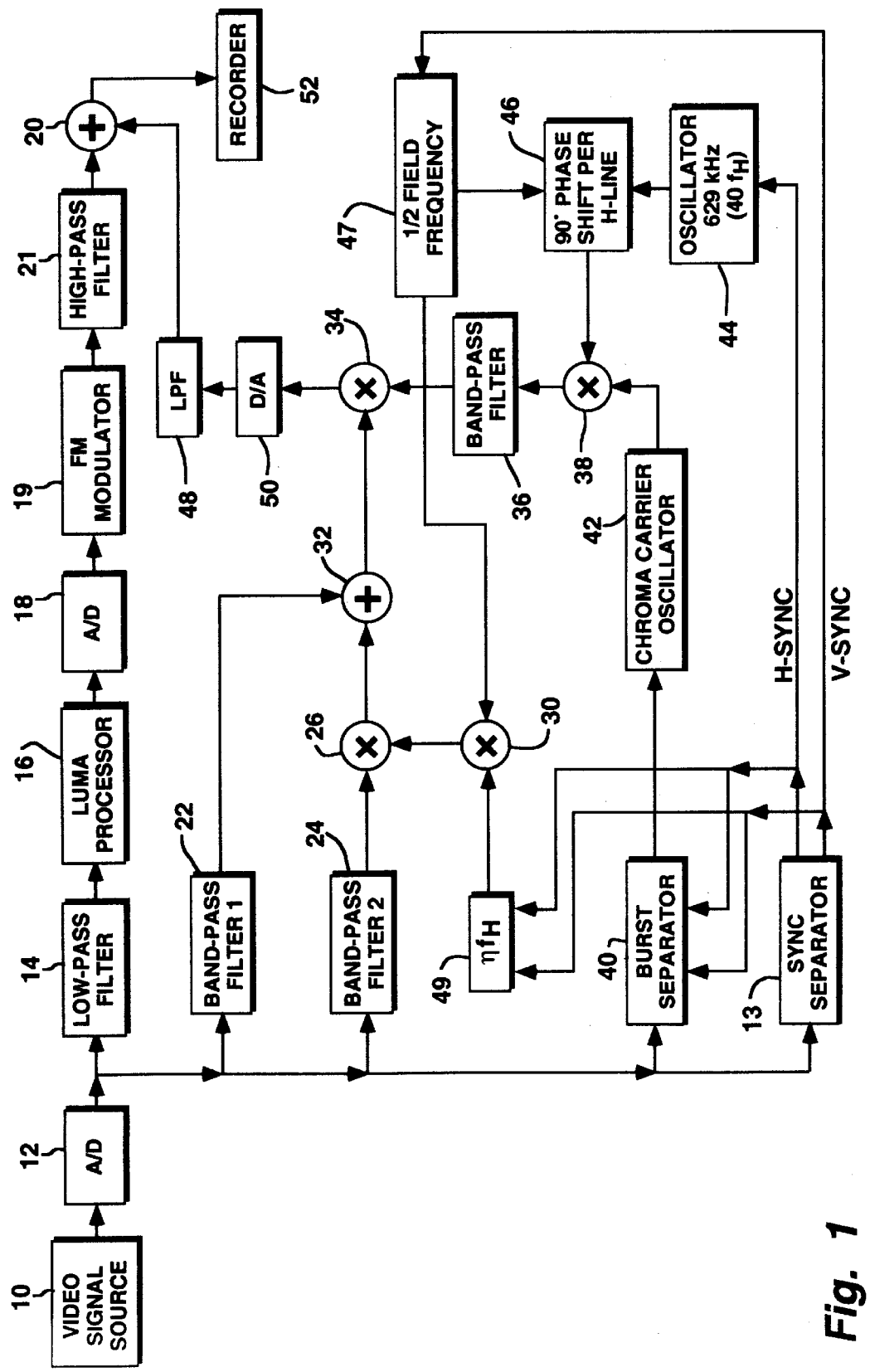
FIG. 1 shows in block diagram form an embodiment in accordance with the invention, for recording.

FIG. 1 shows a block diagram illustrating a preferred embodiment of the invention. A video signal source 10 is coupled to an analog to digital format converter 12 for supplying a composite video signal thereto. A sync separator 13 provides separated horizontal synchronizing pulses and separated vertical synchronizing pulses responsive either to the digitized composite video signal supplied by the analog to digital converter 12, as shown in FIG. 1, or to the analog composite video signal as supplied directly from the video signal source 10. The output of analog to digital converter 12 is coupled to the input of a low-pass filter 14. A luminance processor 16 is coupled to low-pass filter 14 for receiving and further processing the filtered luminance signal. Luminance processor 16 is coupled to the input of a digital to analog format converter 18 whose output is coupled to an FM modulator 19 whose output signal is high pass filtered and applied to one input of a signal adder 20.

The output of analog to digital converter 12 is further coupled to the inputs of first and second bandpass filters, 22 and 24, respectively. The output of filter 24 is coupled to one input of a modulator 26. The other input of modulator 26 is coupled to the output of a modulator 30. The two inputs of modulator 30 are coupled to a signal source 47 of a square wave of one-half field frequency and to a signal source 49 having a frequency of n times the horizontal line frequency, respectively. Various values are possible for n; However, a suitable value for the exemplary embodiment herein described is n=400. For a value of n=400, the modulator frequency is approximately 6.3 MHz. This has the affect of shifting the midband detail signal which is centered at 2.7 MHz (2.25/2+3.15/2) to the high band detail signal which is centered at 3.6 MHz (3.15/2+4.05/2). Furthermore, 400 $f_H$ is ten times the color under carrier of 40 $f_H$, which will allow the two frequencies to be locked to one another, thereby, eliminating or greatly reducing the possibility of unwanted beat frequencies. The frequencies may be locked together deriving the 40 $f_H$ signal from the 400 $f_H$ signal rather than using a separately controlled 629 kHz oscillator 44 as shown in FIG. 1.

If a line-locked oscillator is used for generating a 400 $f_H$ sinusoidal signal digitized by an analog to digital converter in the source 49, zero crossings of the cycles of the 400 $f_H$ signal are counted by counter used as a frequency divider, to derive therefrom an $f_H$ frequency signal compared with separated horizontal synchronizing pulses for generating the error signal used in the automatic phase and frequency control used to line-lock the oscillator that generates the 400 $f_H$ signal in the source 49. The 40 $f_H$ signal can be derived by the analog filtering of a 40 $f_H$ square wave taken from the frequency divider to obtain a 629 kHz sinusoidal wave, that can then be digitized by an analog to digital converter.

Alternatively, the digital samples descriptive of a 400 $f_H$ sinusoidal signal can be generated in the source 49 by reading from read-only memory addressed by a 400 $f_H$ serrasoid generated in digital sample-data form by a counter counting at a sampling rate that is a multiple of 400 $f_H$. The counter is usually provided with extra stages used in frequency division to derive an $f_H$ frequency signal, which is compared with separated horizontal synchronizing pulses for generating the error signal used in an automatic phase and frequency control for the oscillator timing the digital sampling at the multiple of 400 $f_H$. The counter can generate addressing for read-only memory storing samples of the 40 $f_H$ sinusoidal signal, which read-only memory supplies line-locked 629 kHz instead of the oscillator 44.

The source 47 of half-field-rate square wave can be a field counter counting, modulo-two, separated vertical synchronizing pulses supplied from the sync separator 13. This half-field-rate square wave is used in recording circuitry 52 for controlling head switching, in accordance with prior art procedure. The output of modulator 26 is coupled to one input of an adder 32. The other input of adder 32 is coupled to the output of bandpass filter 22.

The output of adder 32 is coupled to one input of a modulator 34. The other input of modulator 34 is coupled to the output of a bandpass filter 36 whose input is coupled to the output of a modulator 38. Bandpass filter 34 selects 4.21 MHz carrier signal from the output of modulator 38 and supplies it to the input of modulator 34.

The output of analog to digital converter 12 is further coupled to a burst separator 40 whose output is coupled to the burst sync input of a chrominance carrier oscillator 42. The output of chrominance carrier oscillator 42 is coupled to an input of modulator 38. The other input of modulator 38 is supplied with a 629 kHz carrier signal which is phase locked to the input video signal. This 629 kHz carrier signal is derived from a 629 kHz oscillator 44 controlled by the horizontal sync derived from the video input signal and whose output is coupled to the input of modulator 38 by way of a phase shifter 46. Phase shifter 46 is controlled by a one-half field rate (30 Hz) switching signal identify supplied from the source 47. Thus, the modulation products of modulator 34 contain the chrominance signal (derived from the output of bandpass filter 22) and luminance components modulated on (3.58±4.21) MHz carriers. The 629 kHz sidebands are selected from the output of modulator 34 by a lowpass filter 48 coupled to modulator 34 by way of a digital to analog converter 50. The output of lowpass filter 48, providing the composite color-under signal, is coupled to the other input of adder 20, referred to earlier. The output of adder 20 is coupled to the recording circuitry 52.

Figure 2:
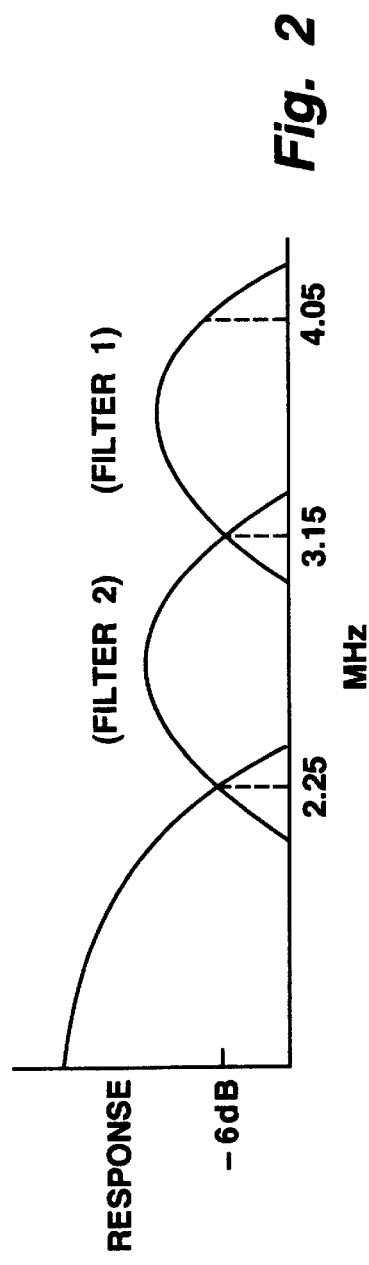
FIG. 2 shows a frequency response graph helpful to an understanding of the invention.

In operation, lowpass filter 14 selects a signal representing a portion of the composite video signal frequency spectrum as shown in the portion of the graph below 2.25 MHz in FIG. 2. In the exemplary embodiment, ideally, the −6 dB point in the passband of lowpass filter 14 is preferably selected to be at 2.25 MHz. However, in practice, it is desirable to make these bandwidths somewhat wider so as not to introduce any attenuation at the band edges, since the analog transmission system tends to determine the attenuation at these band edges anyway. This spectral portion of the composite video signal is summed together with other signals as will be further explained and thereafter processed in the normal manner to a frequency modulated signal that varies from about 3.4 at the sync tip level to about 4.4 MHz for a peak white signal, for recording on tape. Second and third portions of the composite video signal frequency spectrum are selected by bandpass filters 24 and 22, as shown in the graph in FIG. 2. The lower frequency −6 dB point of bandpass filter 24 is set to coincide with that of lowpass filter 14 at 2.25 MHz and its higher frequency −6 dB point is set at 3.15 MHz. The lower frequency −6 dB point of bandpass filter 22 is set to coincide with the higher frequency −6 dB point of bandpass filter 24 at 3.15 MHz. The higher frequency −6 dB point of bandpass filter 22 is set at 4.05 MHz. The overall passband thereby tends to exhibit a reasonably flat response characteristic, with the lowest frequency spectral portion of the composite video signal which comprises primarily a standard luminance signal, being passed by lowpass filter 14, an intermediate frequency spectral portion being passed by bandpass filter 24 and a top frequency spectral portion being passed by bandpass filter 22. The chrominance subcarrier being at 3.58 MHz, most of the chrominance signal is passed by bandpass filter 22, i.e. the highest frequency filter.

The upper spectral portion passed by filter 22 represents "high band" picture detail and chrominance (chroma). The intermediate portion passed by filter 24 corresponds to "mid-band" picture detail. The lowest portion of the spectrum shown in FIG. 2 is conventionally recorded. The upper spectral portion requires no additional modulation since it is in any case present. However, it is not useful without the mid-band portion. In accordance with the present invention, the midband spectral portion, corresponding to the passband of filter 24, is transposed in frequency and spectrally interleaved with the chrominance signal. Thus, the output signal of bandpass filter 24 is transposed into the same band as the chrominance signal by modulation in modulator 26 by a subcarrier that differs from the chrominance subcarrier in that it alternates phase from field to field but does not alternate from line to line. The chrominance signal and the transposed luminance signal are herein referred to as the augmented chrominance signal. The output signal of bandpass filter 22 is then summed to the output of modulator 26 in adder 32. Thus, even though the chrominance information signal with its associated luminance signal, i.e. the augmented chrominance signal, on the one hand, and the luminance signal from bandpass filter 24, on the other hand, occupy the same frequency band, they are separately recoverable because of the difference in their respective carriers.

The augmented chrominance signal is thereafter processed in a known manner for recording on tape by a 629 kHz subcarrier. This is accomplished by the synchronized chrominance subcarrier oscillator (3.58 MHz) output signal being modulated in modulator 38 with a synchronized 629 kHz signal, bandpass filtering the resulting output to select a 4.21 MHz sideband. This signal is then used to modulate the output signal of adder 32 in modulator 34 to produce modulation products which, after filtering, result in the augmented chrominance signal modulated on a 629 kHz carrier. This signal is then summed with the lowpass filtered and processed luminance signal applied to adder 20 which produces an output for recording in recorder portion 52.

Table 1 shows a time domain analytical representation for a number of fields and lines. In Table 1, C is chroma (chrominance), L1 the luma (luminance) from bandpass filter 22 and L2 the luma from bandpass filter 24.

TABLE 1

|  | FIELD #1 | FIELD #2 | FIELD #3 | FIELD #4 |
| --- | --- | --- | --- | --- |
| LINE #1 | $C + L_1 + L_2$ |  | $-C + L_1 + L_2$ |  |
| LINE #2 |  | $-C + L_1 - L_2$ |  | $C + L_1 - L_2$ |
| LINE #3 | $-C + L_1 + L_2$ |  | $C + L_1 + L_2$ |  |
| LINE #4 |  | $C + L_1 - L_2$ |  | $-C + L_1 - L_2$ |
| LINE #5 | $C + L_1 + L_2$ |  | $-C + L_1 + L_2$ |  |

It is apparent from Table 1 that the L1 and L2 signals are unchanged in phase from line to line in the same field. However, the L2 signal reverses phase at corresponding horizontal spatial location from field to field. On the other hand, the chrominance signal alternates in phase at corresponding horizontal spatial location from line to line within the same field and on a given line alternates in every second field. The phasing at corresponding horizontal spatial locations alternates from line to line within each field because there is an exact odd number of color subcarrier cycles in two scan lines, causing adjacent lines to be one-half cycle different in spatial registration on screen.

Figure 3:
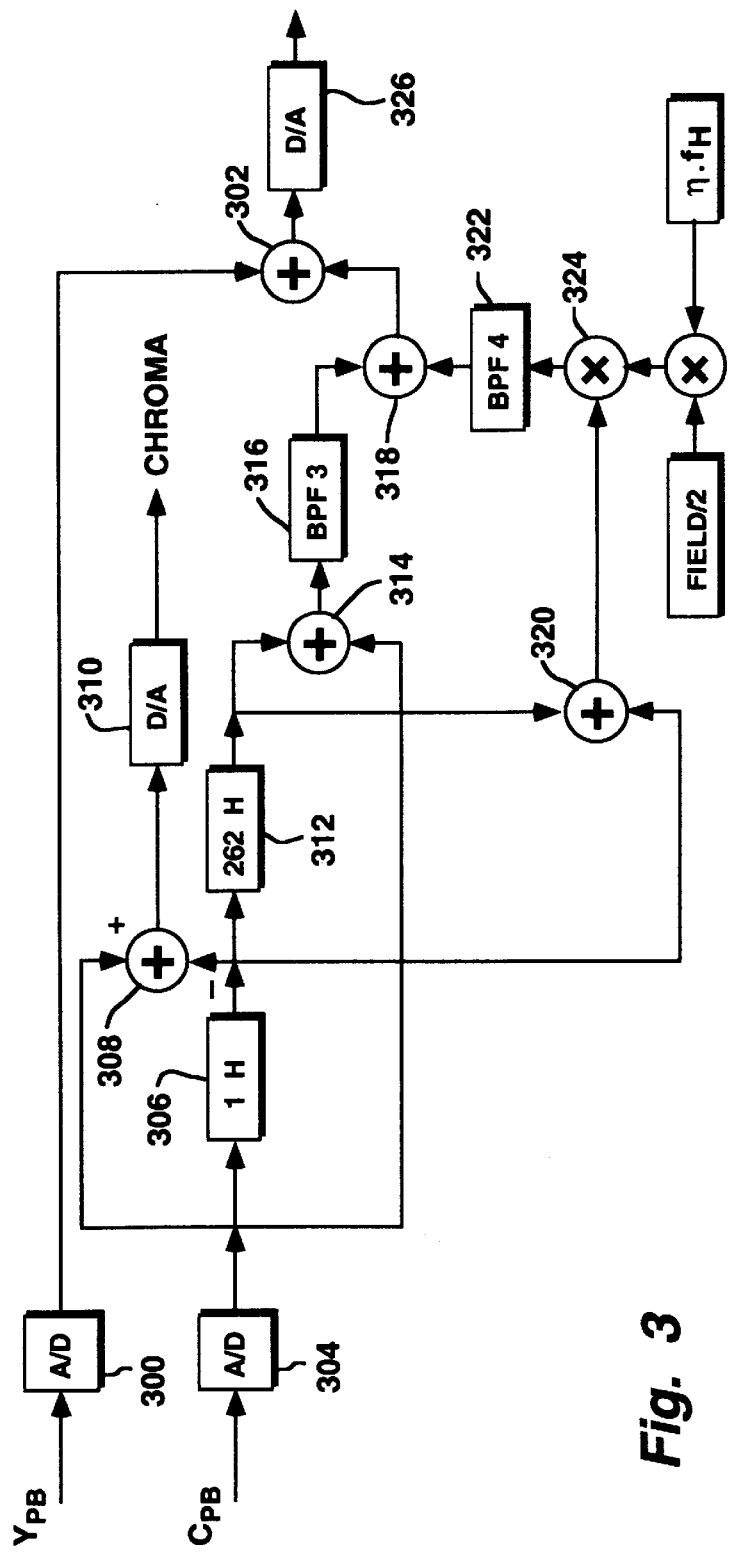
FIG. 3 shows in block diagram form an embodiment in accordance with the invention, for playback.
Figure 6:
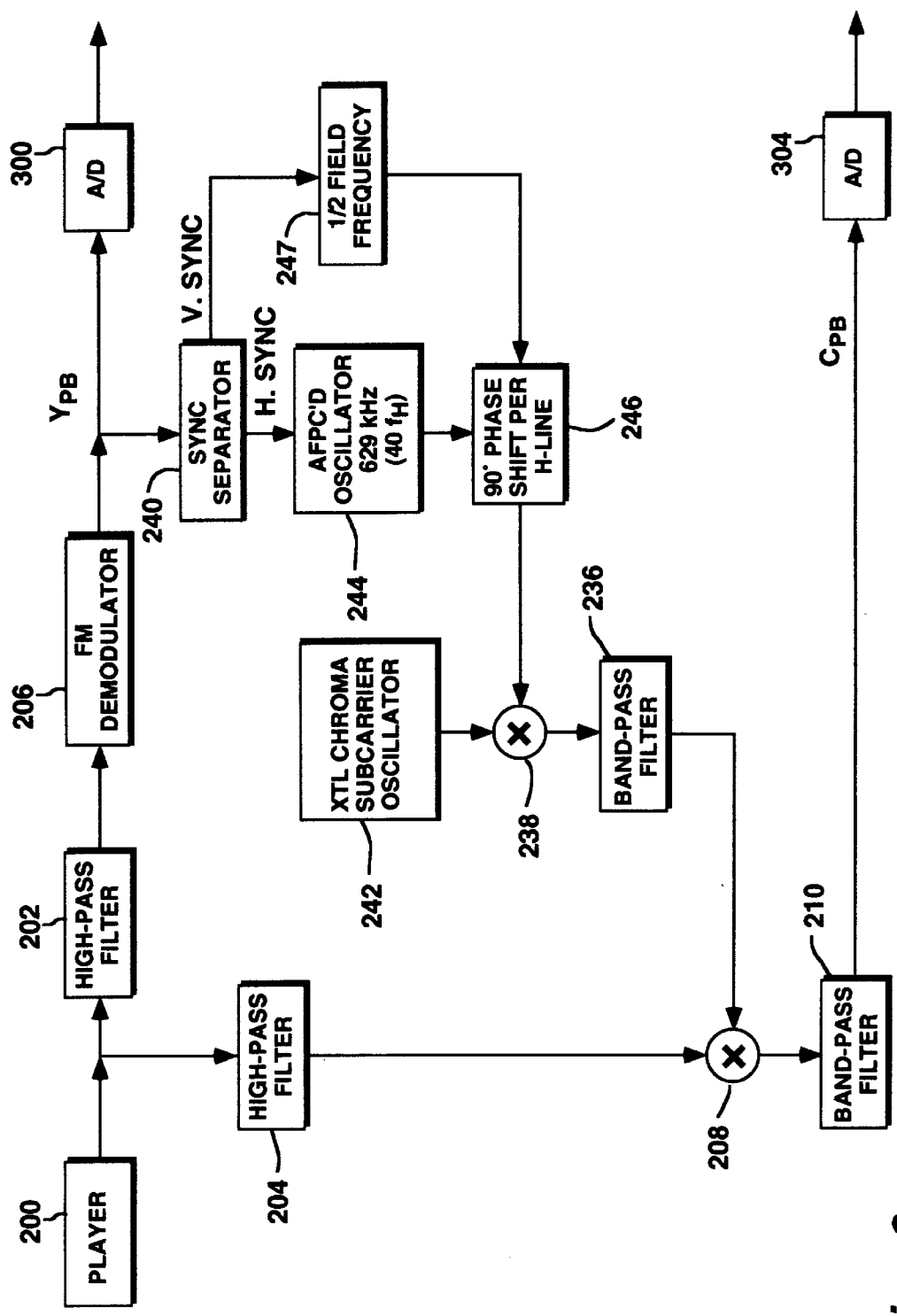
FIG. 6 shows in block digram form apparatus for retrieving luminance and chrominance signals by playing back from a video tape recording.

FIG. 3 shows a block diagram for a preferred embodiment of a playback arrangement for reproducing a recording made in accordance with the present invention. Playback apparatus as shown in FIG. 6 of the drawing supplies a playback luminance signal $Y_{PB}$ and a playback chrominance signal $C_{PB}$ to the FIG. 3 playback arrangement. The playback luma signal $Y_{PB}$ is converted to digital format by an analog to digital converter 300. The output signal of analog to digital converter 300 is applied to an adder 302. The 3.58 MHz playback chroma signal $C_{PB}$, which is an augmented chrominance signal when playing back a recording made in accordance with the present invention, is converted to digital format by an analog to digital converter 304. The output signal of analog to digital converter 304 is comb filtered by a line comb filter comprising 1H delay 306 and an adder 308. The comb filtered output is converted to an analog chroma signal by digital to analog converter 310. The augmented chroma signal is further comb filtered by a field comb filter comprising a 1H delay 306 plus a 262H delay 312, and an adder 314. The output of adder 314 is filtered by bandpass filter 316 having a passband substantially the same as that of bandpass filter 22 in FIG. 1. The output of bandpass filter 22 is applied to an input of an adder 318. The augmented chroma signal is further comb filtered by a field comb filter comprising 262H delay 312, and a subtractor 320. The output of is modulated by modulator 324 with a carrier that does not alternate line to line but that does alternate field to field. The carrier is derived from a modulator 326 having a signal of half the field frequency applied to one input thereof and a signal of n.$f_H$ applied to the other input thereof and having an output coupled to an input of modulator 324 other than that receiving field comb filter response from the subtractor 320. The output signal of the modulator 324 is applied as input signal to a bandpass filter 322, which separates the unfolded midband detail signal from its image for application as a summand to an adder 318.

In operation, the line comb filter comprising 1H delay 306 and adder 308 remove luma components from the chroma channel. Thus, the playback system of FIG. 3 maintains compatibility with existing VHS players. The field comb filter comprising a 1H delay 306 plus 262 If delay 312, and adder 314 and the field comb filter comprising 262H delay 312, and adder 320 separate the respective spectral portions of the luma signal as originally separated by bandpass filters 24 and 22 in FIG. 1. After filtering by bandpass filters 316 and 322, the two signals are added together in adder 318 and thereafter added together with signal $Y_{PB}$, to yield a combined signal of substantially greater bandwidth than that of signal $Y_{PB}$. Furthermore, compatibility is maintained with existing machines and tapes. In practice, bandpass filters 316 and 322 are preferably arranged to have a slightly narrower bandwidth than their respective corresponding filters 22 and 24 in order to facilitate removal of unwanted components introduced adjacent the filter band edges in the analog portions of the signal paths.

Figure 4:
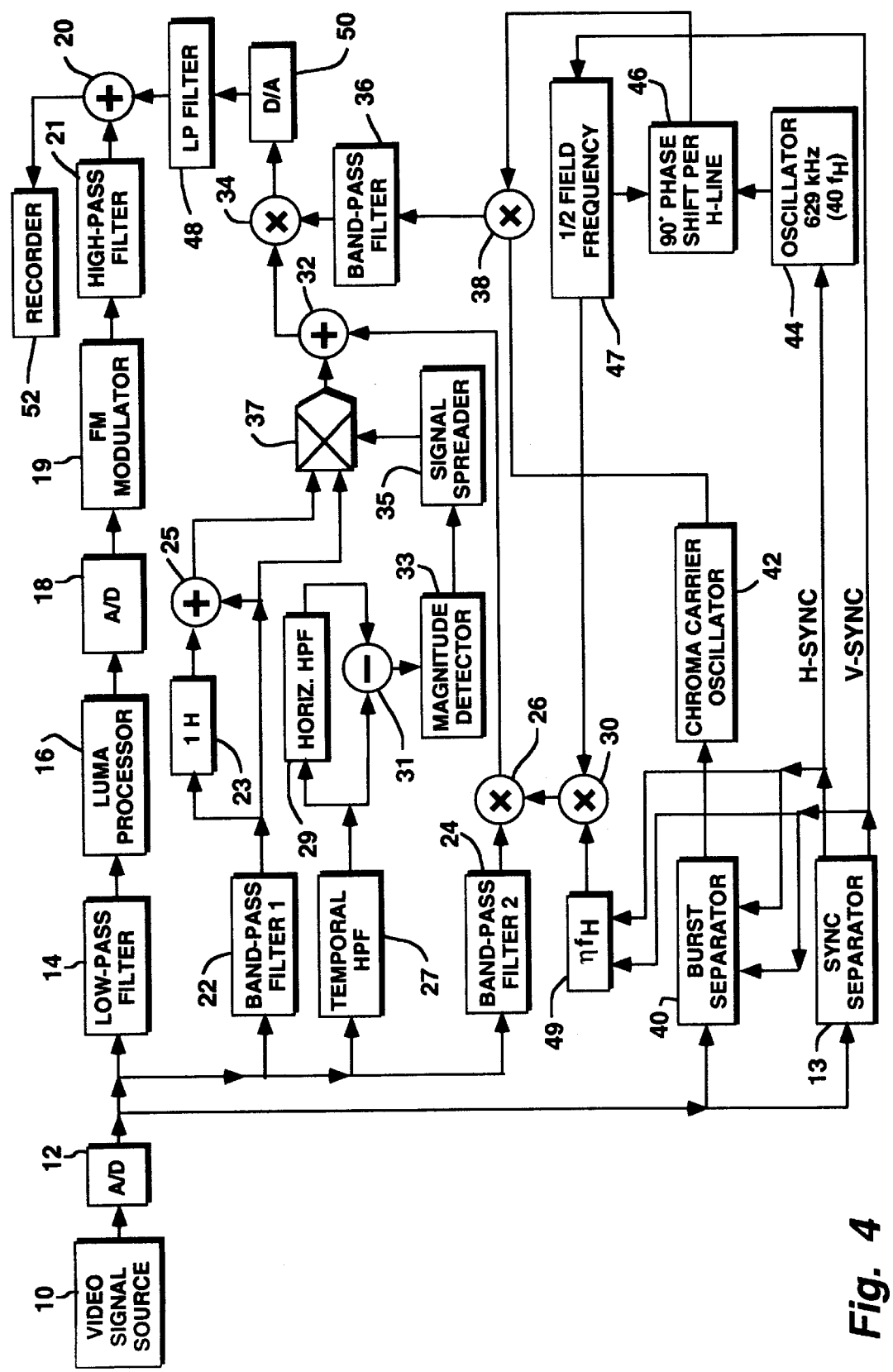
FIG. 4 shows in block diagram form a further embodiment in accordance with the invention, for recording.

FIG. 4 shows an alternative embodiment for the recording portion in accordance with the present invention. Elements in the FIG. 4 embodiment which correspond to the same or similar elements in the FIG. 1 embodiment are marked with the same reference in both figures. In the FIG. 4 embodiment, the composite signal is applied to a lowpass filter 14 for processing as in the FIG. 1 embodiment and to bandpass filters 22 and 24. The composite signal is also supplied, as before, to sync separator 40).

The output signal of bandpass filter 22 is further processed in a motion adaptive circuit. The operation of this circuit will be briefly described here, being essentially similar in principle to that described in U.S. Pat. No. 5,113,262, to which reference is made for a more detailed description of the motion adaptive circuits. The output signal of bandpass filter 22 is thus further applied to a line comb filter comprising a 1H delay 23 and an adder 25 in which the line delayed signal which is applied to an input of adder 25 is subtracted from the undelayed signal which is applied directly to the other input of adder 25. The output of adder 25 and the direct connected output of bandpass filter 22 are applied to respective signal inputs of a soft switch 25. Soft switch 25 is responsive to the level of a control signal applied to its control input for selecting one or the other of the signals applied to its signal inputs and providing the selected signal at its output.

The output of A/D converter 12 is also applied to a motion signal derivation circuit comprising a temporal highpass filter 27 whose output is coupled to the input of a horizontal highpass filter 29. An subtractor 31 is coupled between the input and output of horizontal highpass filter 29 for deriving a difference signal between the signals at the input and output. The difference signal is applied to a magnitude detector 33 whose output is applied to a signal spreader 35. The output of signal spreader 35 is applied to the control input of soft switch 37.

Briefly, when motion is detected in the picture being processed, magnitude detector 33 provides a digital output indicating that motion is present. Signal spreader 35 modifies this signal by spreading. Further details of this aspect are given in U.S. Pat. No. 5,113,262 and in U.S. Pat. No. 5,083,203 issued 21 Jan. 1992 to J. W. Ko et alii and entitled CONTROL SIGNAL SPREADER, the specifications and drawings of which patents are incorporated herein by reference. Soft switch 37 will thus vary the proportion of the two signals present at its signal inputs in response to the signal at its control input supplied from signal spreader 35. If the value of the control signal is zero or nearly zero, indicating no motion or a low level of motion, the soft switch 37 produces an output signal which is completely the output signal of bandpass filter 22, that is, chroma plus high band detail. If the value of the control signal corresponds to a high level of motion, then soft switch 37 produces an output signal which is completely the output of adder 25 which is a chroma signal with the high band detail filtered out. The presence of motion causes cross-talk between the two luma detail signals being sent, and therefore, only the midband detail signal is sent during motion. The line comb filter will separate out the luma signal but reduces the vertical resolution. Thus, the line comb filter signal is preferably used only in the presence of motion. At intermediate values of the motion signal, the output signal of soft switch 37 contains some proportion of each of its input signals. Further details of the operation of soft switch 37 are given in U.S. Pat. No. 5,113,262.

The output of soft switch 37 is then added to the output of bandpass filter 24 in adder 32. Processing thereafter continues as in the embodiment of FIG. 1.

Figure 5:
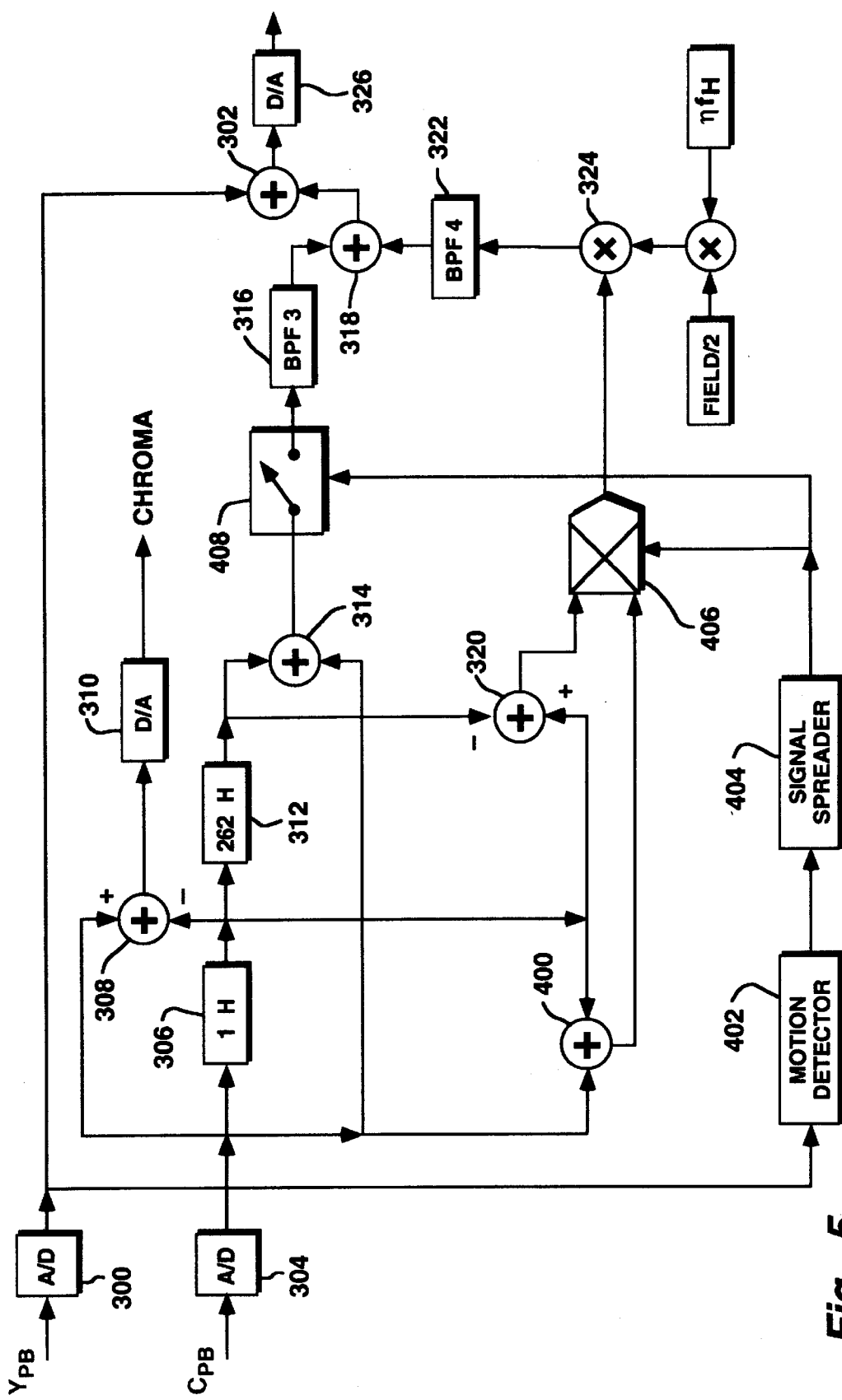
FIG. 5 shows in block diagram form an embodiment in accordance with the invention, for playback.

FIG. 5 shows an embodiment of the invention for playback of signals as recorded using the embodiment of FIG. 4, or otherwise recorded in a conventional manner. Elements in the FIG. 5 embodiment which correspond to the same or similar elements in the FIG. 3 embodiment are marked with the same reference in both figures. In the FIG. 5 embodiment, a motion control signal is derived in the arrangement comprising a motion detector 402 coupled to receive the input luminance signal and supplying a motion signal to a signal spreader 404 which, in turn provides a motion control signal. An adder 400 forms a 1H filter in the same manner as adder 308 and provides an input signal to a soft switch 406. The other input of soft switch 406 is the output of adder 320. Thus, the input to bandpass filter 322 may be entirely the output signal of one of adder 400 and adder 320 or it may comprise a portion of each output signal, depending on the level of a control signal at the control input of soft switch 406. A controlled switch 408 is disposed in the path coupling the output of adder 314 to bandpass filter 316. Depending on the level of a control signal at a control input of controlled switch 408, the output of adder 314 is applied or not applied to the input of bandpass filter 316. The motion control signal from signal spreader 404 is applied to the respective control inputs of soft switch 406 and controlled switch 408. Accordingly, during still areas of the picture, controlled switch 408 is gated on, so that the output of adder 314 is applied to bandpass filter 316 so that the output signal contains horizontal detail. When motion is detected, the detail signal from adder 314 is not used. Furthermore, in the presence of a high level of motion, the output of soft switch 406 corresponds to the output signal of the line comb filter at the output of adder 400; in the absence of motion, the output corresponds to the output of the 263 H field comb filter at the output of adder 320.

It will be understood that compatibility with existing playback and recording systems is maintained because the line comb filters in the chrominance channels remove both the luminance signal from bandpass filter 22 and the luminance signal from bandpass filter 24

FIG. 6 shows playback apparatus, as known in the prior art, for supplying a playback luminance signal $Y_{PB}$ to the analog-to-digital converter 300 of FIG. 3 or 5 and for supplying a playback chrominance signal $C_{PB}$ to the analog-to-digital converter 304 of FIG. 3 or 5. A tape player 200, which may use the same tape transport apparatus as the recorder 52, includes electronics for amplifying variations in the magnetism of the tape coating as sensed by the playback heads. The tape player 200 supplies this amplified signal, which reproduces the signal supplied to the recorder 52 for recording, to a high-pass filter 202 and to a low-pass filter 204. The high-pass filter 202 separates the frequency-modulated luminance carrier signal from the color-under signal. A frequency-modulation demodulator 206 detects the $Y_{PB}$ luma signal from the frequency-modulated luminance carrier signal separated by the high-pass filter 202. This playback luminance signal $Y_{PB}$ is supplied as input signal to the analog-to-digital converter 300. The low-pass filter 204 separates the color-under signal from the frequency-modulated luminance carrier signal. The separated color-under signal is mixed with one of four phases of a 4.21 MHz carrier in a mixer 208, and mixer results are filtered with a band-pass filter to separate the 3.58 MHz chroma sidebands supplied as the $C_{PB}$ input signal to the analog-to-digital converter 304. In some designs band-pass filters are used instead of the high-pass filter 202 and the low-pass filter 204.

While the invention has been described by way of exemplary embodiments using a 3.58 MHz chroma carrier with modulation subsequently of the chroma and detail signals on a 629 kHz carrier, the invention is readily adaptable to application where the baseband signals can be modulated directly on a 629 kHz carrier.

Furthermore, where the chroma subcarrier is encoded with phase relationships that are different from the VHS system forming the context of the described embodiments, such in the PAL and Beta formats, the present invention is adaptable with appropriate adjustment of the subcarrier phases utilized.

In the present embodiments, carrier switching phase switching field to field is implemented before modulation; clearly, this order can be reversed.

These and other modifications will be apparent to those skilled in the art and are intended to be within the scope and spirit of the invention which is limited only by the claims following.

I claim:

1. A system for processing video information including a luminance signal and a chrominance signal, which said chrominance signal comprises a suppressed chroma carrier having a phase that at corresponding horizontal spatial locations alternates from line to line within each field and being modulated with chrominance information, and having synchronizing signals included within at least one of said luminance and chrominance signals, said system comprising:

means responding to at least one of said synchronizing signals for generating a phase alternated carrier having a phase that at corresponding horizontal spatial locations is not different from line to line within each field, but does alternate from field to field;

means for modulating said phase alternating carrier in accordance with an auxiliary signal to generate an auxiliary modulation result; and means for adding said auxiliary modulation result to said chrominance signal.

2. A system as recited in claim 1, further comprising filter means for selecting a spectral portion of said luminance signal having frequencies above another spectral portion of said luminance signal to provide said auxiliary signal.

3. A video signal processing system, comprising:

a source of composite video signal comprising a luminance signal and a chrominance signal, said luminance signal having a baseband frequency spectrum extending to a maximum frequency, said chrominance signal comprising amplitude modulation sidebands of each of two mutually orthogonal phasings of a suppressed chroma carrier having a frequency substantially below said maximum frequency and having a phase that at corresponding horizontal spatial locations alternates from line to line, said amplitude modulation sidebands and the baseband frequency spectrum of said luminance signal combining in a frequency spectrum of said composite video signal that does not extend substantially beyond said maximum frequency of said luminance signal;

first, second, and third filter means for selecting respective first, second, and third spectral portions of said composite video signal as respectively reposed in first, second and third portions of the frequency spectrum of said composite video signal, said first portion of said frequency spectrum being comprised of just a region surrounding the frequency of said chroma carrier that contains said chrominance signal as well as said first spectral portion of said luminance signal, said third portion of said frequency spectrum being comprised of lower frequencies of said composite video signal, and said second portion of said frequency spectrum being intermediate to said first is and third portions of said frequency spectrum;

means for frequency-modulating a luminance carrier in accordance with said third spectral portion to generate a frequency-modulation signal, said luminance carrier having a frequency above a band of color-under signal frequencies;

high pass filter means for high pass filtering said frequency-modulation signal to produce a high pass filtered signal having frequencies above the band of color-under signal frequencies;

frequency translating means for frequency transposing into the band of color-under signal frequencies, as color-under signal and augmentation signal components respectively of an augmented color-under signal, said first spectral portion and said second spectral portion of said composite video signal as respectively supplied to said frequency translating means from said first filter means and from said second filter means; and means for summing said augmented color-under signal and said high pass filtered signal as supplied to said means for summing from said frequency translating means and from said high pass filter means, thereby to produce an output signal.

4. A video signal processing system for a composite video signal comprising a luminance signal and a chrominance signal, said chrominance signal comprising a suppressed chroma carrier having a phase that at corresponding horizontal spatial locations alternates from line to line and is modulated with chrominance information, said video signal processing system comprising:

first, second, and third filter means for selecting respective first, second, and third spectral portions of said composite video signal as respectively reposed in first, second and third portions of a frequency spectrum, said first portion of said frequency spectrum being comprised of just a region surrounding the frequency of said chroma carrier that contains said chrominance signal as well as said first spectral portion of said luminance signal, said third portion of said frequency spectrum being comprised of lower frequencies of said composite video signal, and said second portion of said frequency spectrum being intermediate to said first and third portions of said frequency spectrum;

means for frequency-modulating a luminance carrier in accordance with said third spectral portion to generate a frequency-modulation signal, said luminance carrier having a frequency above a band of color-under signal frequencies;

high pass filter means for high pass filtering said frequency-modulation signal to produce a high pass filtered signal the frequencies of which are above the band of color-under signal frequencies;

frequency translating means for frequency transposing into the band of color-under signal frequencies, as color-under signal and augmentation signal components respectively of an augmented color-under signal, said first spectral portion and said second spectral portion of said composite video signal as respectively supplied to said frequency translating means from said first filter means and from said second filter means; and means for summing said augmented color-under signal and said high pass filtered signal as supplied to said means for summing from said frequency translating means and from said high pass filter means, thereby to produce an output signal, wherein said frequency translating means comprises:

first frequency transposing means for transposing the frequencies of said second spectral portion of said composite video signal into said first portion of said frequency spectrum to generate a frequency-transposed second spectral portion;

means for providing a carrier signal to said first frequency transposing means for intermodulating with said second spectral portion to transpose the frequencies of said second spectral portion to said first portion of said frequency spectrum, the phase of said carrier signal at corresponding horizontal spatial locations not differing from line to line within each field but alternating from field to field, so that the significant spectral component frequencies of said frequency-transposed second spectral portion lie between intermediate significant spectral component frequencies of said first spectral portion;

means for combining said frequency-transposed second spectral portion of said composite video signal with said first spectral portion, including both luminance signal and chrominance signal components thereof, to generate an augmented chrominance signal; and second frequency transposing means for generating said augmented color-under signal by transposing the frequencies of said augmented chrominance signal to said band of color-under signal frequencies.

5. A video signal processing system as recited in claim 4, further comprising means for recording said output signal onto a recording medium.

6. A video signal processing system for recording a wideband video signal on a limited bandwidth medium, comprising:

an input terminal for receiving a composite video signal;

signal processing means for separating said composite video signal into a first frequency band including a chrominance signal and a first luminance signal component, a second frequency band including a second luminance signal component, and a third frequency band including a third luminance signal component, said first and second and third frequency bands being contiguous frequency bands overlapping only at the edges of said first and second frequency bands and at the edges of said second and third frequency bands, said first frequency band containing higher frequencies than said second frequency band, and said third frequency band containing lower frequencies than said second frequency band;

means for generating an augmented chrominance signal by folding said second luminance signal component into said first frequency band so as to interleave with said first luminance signal component; and means for recording said third luminance signal component and said augmented chrominance signal.

7. A video signal processing system as recited in claim 6, wherein said signal processing means comprises:
   a first bandpass filter for supplying a selective responsive to a portion of said composite video signal in said first frequency band and
   a second bandpass filter for supplying a selective responsive to a portion of said composite video signal in said second frequency band; and wherein said means for providing an augmented chrominance signal comprises:
   a source of a first modulating frequency;
   first modulator means, having a first input to which the selective response of said second bandpass filter is applied and having a second input coupled to said source of a first modulating frequency, and having an output at which a transposed response to signals in said second frequency band is supplied in said first frequency band;
   first adding means having a first input, having a second input to which an output of said first modulator means is coupled, and having an output for providing said augmented chrominance signal as a linearly combined response to signals received at the first and second inputs of said first adding means;
   means for applying at least selected portions of the selective response of said first bandpass filter to the first input of said first adding means; and
   combining means for combining said third luminance component and said augmented chrominance signal.

8. A video signal processing system as recited in claim 7, wherein said combining means comprises:
   means for generating a frequency-modulation signal by modulating the frequency of a luminance carrier in response to said third luminance signal component;
   filter means for filtering said frequency-modulation signal to generate a response in which lower frequency components of said frequency-modulation signal are suppressed that otherwise would fall within a color-under band;
   means responding to said augmented chrominance signal for generating an augmented color-under signal, which means includes
   a source of a second modulating frequency and
   second modulator means having a first input to which an output of said first adding means is coupled and having a second input to which said source of a second modulating frequency and is coupled; and
   second adding means having a first input to which the response of said filter means is applied, having a second input to which an output of said second modulator means is coupled, and having an output for supplying a signal suitable for recording.

9. A video signal processing system as recited in claim 8, wherein said means for applying at least selected portions of the selective response of said first bandpass filter to the first input of said first adding means comprises:
   a line comb filter for providing high-pass line comb filter response to portions of the selective response of said first bandpass filter, that include chrominance signal but not high band luminance detail;
   a motion spread signal generator for supplying a low-pass spatial filter response to the magnitudes of frame-to-frame comparisons of elements of said composite video signal that exceed a prescribed threshold level, which low-pass spatial filter response is descriptive of image motion;
   a soft switch having a first input to which the selective response of said first bandpass filter is applied, having a second input to which said high-pass line comb filter response is applied, having an output coupled to said first input of first adding means, and having a control terminal to which the low-pass spatial filter response of said motion spread signal generator is applied.

10. A video signal processing system as recited in claim 9, wherein, when the low-pass spatial filter response of said motion spread signal generator is relatively low, said soft switch supplies a signal from its output primarily responsive to the selective response of said first bandpass filter supplied to its said first input; and wherein, when the low-pass spatial filter response of said motion spread signal generator is relatively high, said soft switch supplies a signal from its output primarily responsive to the high-pass line comb filter response applied to its said second input.

11. A video signal processing system as recited in claim 10, wherein said first modulating frequency is locked to a horizontal sweep rate and exhibits field to field alternation.

12. A video signal processing system for an augmented chrominance signal, as recovered from an augmented color-under signal component of a video signal recorded on a limited bandwidth medium with said augmented color-under signal encoding a chrominance signal and first and second spectral portions of a luminance signal originally disposed in first and second frequency bands, and for a third spectral portion of said luminance signal disposed in a third frequency band, as recovered from a frequency-modulated luminance carrier portion of said video signal, which frequency-modulated luminance carrier portion of said video signal is higher in frequency than said augmented color-under signal, said first, second and third frequency bands being contiguous frequency bands overlapping only at the edges of said first and second frequency bands and at the edges of said second and third frequency bands, said first frequency band containing higher frequencies than said second frequency band, and said third frequency band containing lower frequencies than said second frequency band, said second spectral portion of said luminance signal being folded into said first spectral portion of said luminance signal within said augmented chrominance signal, said video signal processing system comprising:
   signal processing means responsive to said augmented chrominance signal for separating from said augmented chrominance signal at least one component thereof which essentially consists of said second spectral portion of said luminance signal as folded into said first frequency band;
   unfolding means for unfolding said second spectral portion of said luminance signal as folded into said first frequency band, so as to transpose said second spectral portion back into said second frequency band; and
   means for combining said second spectral portion of said luminance signal, as transposed back into the second frequency band, and said first spectral portion of said luminance signal disposed in the first frequency band, thereby to generate an upper-frequency luminance signal extending over said second and first frequency bands.

13. A video signal processing system as recited in claim 12, wherein said signal processing means comprises:
   a line comb filter responding to said augmented chrominance signal for supplying said chrominance signal separated from said first spectral portion of said luminance signal and said second spectral portion of said luminance signal, and a 262H field comb filter responding to said augmented chrominance signal, as delayed by one horizontal scan time, for supplying said second spectral portion of said luminance signal as folded into said first frequency to said unfolding means for unfolding so as to transpose said second spectral portion back into said second frequency band.

14. A video signal processing system as recited in claim 13, wherein said line comb filter comprises:

a 1H delay line for delaying said augmented chrominance signal by the duration of one horizontal scan line to provide a first delayed augmented chrominance signal; and means for subtractively combining said augmented chrominance signal and said first delayed augmented chrominance signal to provide, as a first subtractive combining response, said chrominance signal separated from said first spectral portion of said luminance signal and said second spectral portion of said luminance signal and wherein said 262H field comb filter comprises:

a 262H delay line for further delaying said first delayed augmented chrominance signal by the duration of an additional 262 horizontal scan lines, to provide a second delayed augmented chrominance signal;

means for subtractively combining said first and second delayed augmented chrominance signals to generate a second subtractive combining response essentially consisting of the second spectral portion of said luminance signal component as folded into said first frequency band, which said second subtractive combining response is applied to said unfolding means.

15. A video signal processing system as recited in claim 14, wherein said signal processing means further comprises:

means for additively combining said augmented chrominance signal and said second delayed augmented chrominance signal to generate an additive combining response; and a first filter responding to said additive combining response over said first frequency band for separating said first spectral portion of said luminance signal component from said chrominance signal and said second spectral portion of said luminance signal.

16. A video signal processing system as recited in claim 15, wherein said unfolding means comprises:

a source of a phase-alternating carrier signal switched in phase between adjoining scan lines in the same field;

modulator means for modulating said carrier signal in accordance with said second subtractive response, to generate a modulator response comprising said second spectral portion of said luminance signal as transposed back into the second frequency band together with an undesired image thereof; and a second filter responding to said modulator response over said second frequency band for providing said second spectral portion of said luminance signal separated from said undesired image thereof, for application to said means for combining said second spectral portion of said luminance signal, as transposed back into the second frequency band, and said first spectral portion of said luminance signal disposed in the first frequency band, as supplied by said first filter.

17. A video signal processing system as recited in claim 15, further comprising:

means for combining said upper-frequency luminance signal extending over said second and third frequency bands and said third spectral portion of said luminance signal component, as recovered from a frequency-modulated luminance carrier portion of said video signal, to generate a wide-spectrum luminance signal extending over said first, second and third frequency bands.

18. A video signal processing system as recited in claim 16, wherein said source of carrier signal is of a type that provides said carrier signal having a frequency locked to a horizontal sweep rate and exhibiting field to field alteration.

19. A video signal processing system as recited in claim 12, wherein said signal processing means comprises:

a 1H delay line for delaying said augmented chrominance signal by the duration of one horizontal scan line to provide a first delayed augmented chrominance signal;

a 262H delay line for further delaying said first delayed augmented chrominance signal by the duration of an additional 262 horizontal scan lines, to provide a second delayed augmented chrominance signal;

means for subtractively combining said augmented chrominance signal and said first delayed augmented chrominance signal to provide said chrominance signal, separated from said first spectral portion of said luminance signal and said second spectral portion of said luminance signal, as a first line comb filter response;

means for additively combining said augmented chrominance signal and said first delayed augmented chrominance signal, to generate a second line comb filter response;

means for subtractively combining said augmented chrominance signal and said second delayed augmented chrominance signal to generate a first field comb filter response;

means for additively combining said augmented chrominance signal and said second delayed augmented chrominance signal, to generate a second field comb filter response;

a motion spread signal generator for supplying a low-pass spatial filter response to the magnitudes of frame-to-frame comparisons of elements of said third spectral portion of said luminance signal as recovered from a frequency-modulated luminance carrier portion of said video signal that exceed a prescribed threshold level, which low-pass spatial filter response is descriptive of image motion;

a soft switch having a first input for receiving said first field comb filter response, having a second input for receiving said second line comb filter response, having an output for supplying soft switch response to said unfolding means, and having a control terminal to which the low-pass spatial filter response of said motion spread signal generator is applied, such that, when said low-pass spatial filter response is relatively high, said soft switch response is primarily to said first line comb filter response and, when said low-pass spatial filter response is relatively low, said soft switch response is primarily to said first field comb filter response;

transmission switch means for selectively transmitting said second field comb filter response when and only when the low-pass spatial filter response of said motion spread signal generator does not exceed a prescribed magnitude; and a first filter selectively responding over said first frequency band to said second field comb response, as selectively transmitted by said transmission switch means, for separating said first spectral portion of said luminance signal component from said chrominance signal and said second spectral portion of said luminance signal.

20. A video signal processing system as recited in claim 19 wherein said unfolding means comprises:

a source of a carrier signal;

modulator means for modulating said carrier signal in accordance with said soft switch response, to generate a modulator response comprising said second spectral portion of said luminance signal as transposed back into the second frequency band together with an undesired image thereof; and a second filter responding to said modulator response over said second frequency band for providing said second spectral portion of said luminance signal separated from said undesired image thereof, for application to said means for combining said second spectral portion of said luminance signal and said third spectral portion of said luminance signal disposed in the third frequency band.

21. In a video signal processing system for a composite video signal of the nature used to modulate the picture carrier in a broadcast television signal, said composite video signal comprising a luminance signal and a chrominance signal comprising a suppressed chroma carrier having a spatial phase alternating from line to line and modulated with chrominance information, said luminance signal extending over a frequency band and said chrominance signal being contained within a portion of said frequency band, a method for recording comprising the steps of:

selecting by filtering first, second, and third spectral portions of said composite video signal as respectively reposed in first, second and third portions of a frequency spectrum, said first portion of said frequency spectrum being comprised of just a region about said chroma carrier, said third portion of said frequency spectrum being comprised of lower frequency of said composite video signal, and said second portion of said frequency spectrum extending between said first and third portions of said frequency spectrum;

frequency transposing said second spectral portion of said frequency spectrum to generate a frequency-transposed second spectral portion; and combining said first spectral portion with said frequency-transposed second spectral portion to provide an augmented signal comprising said chrominance signal, components of said luminance signal included in said first spectral portion of said frequency spectrum, and said frequency-transposed second spectral portion.

22. A method as recited in claim 21, comprising the further steps of:

modulating the frequency of a luminance carrier in response to signals in said third spectral portion, to generate a frequency-modulation signal;

high pass filtering said frequency-modulation signal to produce a high-pass-filtered frequency-modulation signal;

combining said augmented signal and said high-pass-filtered frequency-modulation signal to produce an output signal.

23. A method as recited in claim 22 wherein said step of frequency transposing said second spectral portion into said first portion of said frequency spectrum to generate a frequency-transposed second spectral portion comprises the substeps of:

modulating a carrier signal having a phase that at corresponding horizontal spatial locations alternates from field to field, but not from line to line, said modulating being a suppressed-carrier amplitude modulation done in accordance with said second spectral portion of said composite video signal to generate a modulation result; and filtering said modulation result to separate said frequency-transposed second spectral portion reposing in said first portion of said frequency spectrum.

24. A method as recited in claim 23, further comprising the step of:

selecting a frequency for said carrier signal such that said second spectral portion of said composite video signal is transposed into said first portion of the frequency spectrum with the significant spectral component frequencies resulting from the transposition of said second spectral portion of said composite video signal into said first spectral portion interleaving with significant spectral component frequencies of signals in said first spectral portion.

25. A method in accordance with claim 24, comprising the step of recording said output signal.

26. A video signal processing system for a composite video signal comprising a luminance signal and a chrominance signal, said chrominance signal comprising a suppressed chroma carrier having a phase that at corresponding horizontal spatial locations alternates from line to line and is modulated with chrominance information, said video signal processing system comprising:

first, second, and third filter means for selecting respective first, second, and third spectral portions of said composite video signal as respectively reposed in first, second and third portions of a frequency spectrum, said first portion of said frequency spectrum being comprised of just a region surrounding the frequency of said chroma carrier that contains said chrominance signal as well as said first spectral portion of said luminance signal, said third portion of said frequency spectrum being comprised of lower frequencies of said composite video signal, and said second portion of said frequency spectrum being intermediate to said first and third portions of said frequency spectrum;

means for frequency-modulating a luminance carrier in accordance with said third spectral portion to generate a frequency-modulation signal, said luminance carrier having a frequency above a band of color-under signal frequencies;

high pass filter means for high pass filtering said frequency-modulation signal to produce a high pass filtered signal having frequencies above the band of color-under signal frequencies;

frequency translating means for frequency transposing into the band of color-under signal frequencies, as color-under signal and augmentation signal components respectively of an augmented color-under signal, said first spectral portion and said second spectral portion of said composite video signal as respectively supplied to said frequency translating means from said first filter means and from said second filter means; and means for summing said augmented color-under signal and said high pass filtered signal as supplied to said means for summing from said frequency translating means and from said high pass filter means, thereby to produce an output signal; wherein said frequency translating means comprises:

first frequency transposing means for transposing the frequencies of said second spectral portion of said composite video signal into said first portion of said frequency spectrum to generate a frequency-transposed second spectral portion;

means for combining said first spectral portion and said frequency-transposed second spectral portion to generate an augmented chrominance signal comprising said chrominance signal, components of said luminance signal included in said first spectral portion of said frequency spectrum, and said frequency-transposed second spectral portion; and second frequency transposing means for transposing the frequencies of said augmented chrominance signal to said band of color-under signal frequencies, to generate said augmented color-under signal.

27. A video signal processing system as recited in claim 26, in combination with:

means for recording said output signal on a recording medium;

means for reproducing said output signal recorded on said recording medium, to provide a playback signal;

means for filtering said playback signal to separate therefrom a played-back frequency-modulation signal and a played-back augmented color-under signal;

means for demodulating said played-back frequency-modulation signal to generate a played-back third spectral portion of said composite video signal; means for upconverting said played-back augmented color-under signal to generate a played-back augmented chrominance signal;

means for filtering said played-back augmented chrominance signal for separating therefrom a played-back chrominance signal without augmentation, a played-back first spectral portion of said luminance signal, and a played-back frequency-transposed second spectral portion of said luminance signal;

means for frequency transposing said played-back frequency-transposed second spectral portion of said luminance signal back to its original position in the frequency spectrum to produce a played-back second spectral portion of said luminance signal; and means for summing said played-back first spectral portion of said luminance signal, said played-back second spectral portion of said luminance signal, and said played-back third spectral portion of said composite video signal to produce a full-spectrum played-back luminance signal.

28. A video signal processing system as recited in claim 26, in combination with:

means for recording said output signal on a recording medium;

means for reproducing said output signal recorded on said recording medium, to provide a playback signal;

means for filtering said playback signal to separate therefrom a played-back frequency-modulation signal and a played-back augmented color-under signal;

means for demodulating said played-back frequency-modulation signal to generate a played-back third spectral portion of said composite video signal;

means for upconverting said played-back augmented color-under signal to generate a played-back augmented chrominance signal;

means for filtering said played-back augmented chrominance signal for separating therefrom a played-back chrominance signal without augmentation, a played-back first spectral portion of said luminance signal, and a played-back frequency-transposed second spectral portion of said luminance signal;

means for frequency transposing said played-back frequency-transposed second spectral portion of said luminance signal back to its original position in the frequency spectrum to produce a played-back second spectral portion of said luminance signal;

means for summing said played-back first spectral portion of said luminance signal, said played-back second spectral portion of said luminance signal, and said played-back third spectral portion of said composite video signal to produce a full-spectrum played-back luminance signal;

a first digital-to-analog converter for converting said full-spectrum played-back luminance signal to analog form; and a second digital-to-analog converter for converting said played-back chrominance signal without augmentation to analog form.

29. A video signal processing system, comprising:

means for receiving a composite video signal;

filter means for filtering said composite video signal into a first frequency band including a chrominance signal and a first luminance signal component, a second frequency band including a second luminance signal component, and a third frequency band including a third luminance signal component, said first frequency band containing higher frequencies than said second frequency band, and said third frequency band containing lower frequencies than said second frequency band;

means for generating a transposed luminance signal by transposing frequencies of said second luminance signal component into said first frequency band so as to fold said second luminance signal component into said first frequency in accordance with a first carrier having a phase that alternates from field-to-field but not from line-to-line;

means for generating an augmented chrominance signal by combining said chrominance signal of said first frequency band with said transposed luminance signal; and means for processing said augmented chrominance signal and said third luminance signal component and recording processed signals on a recording medium.

30. The video signal processing system as recited in claim 29, wherein said filter means comprises:

first band-pass filter means for passing signals in said first frequency band from said composite video signal;

second band-pass filter means for passing signals in said second frequency band from said composite video signal; and low-pass filter means for passing signals in said third frequency band from said composite video signal.

31. The video signal processing system as recited in claim 30, wherein said processing means comprises:

modulator means for providing a modulated augmented chrominance signal by modulating said augmented chrominance signal in accordance with a second carrier;

low-pass filter means for providing an augmented color-under signal by low-pass filtering said modulated augmented chrominance signal;

frequency modulator means for generating a frequency-modulation signal by modulating the frequency of a luminance carrier in response to said third luminance signal component;

high-pass filter means for providing a high-pass filtered luminance signal by filtering said frequency-modulation signal to suppress lower frequency components;

means for providing said processed signals by combining said high-pass filtered luminance signal and said augmented color-under signal; and means for recording said processed signals on said recording medium.

32. The video signal processing system as recited in claim 30, wherein said means for generating said augmented chrominance signal further comprises:

a 1H comb filter for line-comb filtering the signals in said first frequency band passed through said first bandpass filter means to generate a comb-filtered signal;

a motion spreader for supplying a low-pass spatial filter response to frame-to-frame comparisons of elements of said composite video signal in dependence upon detection of changes indicative of image formation;

a soft switch for enabling controlled transmission of the signals in said first frequency band and the comb-filtered signal under control of said motion spreader; and an adder for adding an output of said soft switch and said transposed luminance signal to provide said augmented chrominance signal.

33. The video signal processing system as recited in claim 32, further comprised of said soft switch supplying the signals in said first frequency band to said adder when no motion is detected, and supplying the comb-filtered signal when motion is detected.

34. The video signal processing system as recited in claim 31, wherein said second carrier is locked to a horizontal sweep rate and exhibits field to field alternation.

35. The video signal processing system as recited in claim 29, further comprising:

means for reproducing said processed signals indicative of said augmented chrominance signal and said third luminance signal component recorded on said recording medium;

signal processing means responsive to said augmented chrominance signal, for separating from said augmented chrominance signal at least one component which essentially consists of said second luminance signal component as transposed into said first frequency band;

means for unfolding said second luminance signal component folded into said first frequency band so as to transpose said second luminance signal component unfolded from said first frequency band back into said second frequency band; and means for combining said second luminance signal component transposed back into said second frequency band, and said third luminance signal component to generate a wide-spectrum luminance signal extending over said second and third frequency bands.

* * * * *